United States Patent [19]
Senator et al.

[11] Patent Number: 5,761,677
[45] Date of Patent: Jun. 2, 1998

[54] COMPUTER SYSTEM METHOD AND APPARATUS PROVIDING FOR VARIOUS VERSIONS OF A FILE WITHOUT REQUIRING DATA COPY OR LOG OPERATIONS

[75] Inventors: Steven T. Senator; Billy J. Fuller, both of Colorado Springs, Colo.

[73] Assignee: Sun Microsystems, Inc., Palo Alto, Calif.

[21] Appl. No.: 582,465

[22] Filed: Jan. 3, 1996

[51] Int. Cl.$^6$ .................................................. G06F 17/40
[52] U.S. Cl. .......................... 707/203; 707/8; 707/200; 707/201; 707/202; 707/204
[58] Field of Search .......................... 395/608, 616, 395/617, 618, 619, 620; 707/8, 200, 201, 202, 203, 204

[56] References Cited

U.S. PATENT DOCUMENTS

| | | | |
|---|---|---|---|
| 4,425,618 | 1/1984 | Bishop et al. | 364/300 |
| 4,627,019 | 12/1986 | Ng | 364/900 |
| 4,875,155 | 10/1989 | Iskiyan et al. | 364/200 |
| 4,875,159 | 10/1989 | Cary et al. | 364/200 |
| 5,347,653 | 9/1994 | Flynn et al. | 395/600 |
| 5,440,730 | 8/1995 | Elmasri et al. | 395/600 |
| 5,559,991 | 9/1996 | Kanfi | 395/489 |
| 5,574,906 | 11/1996 | Morris | 395/601 |
| 5,579,223 | 11/1996 | Raman | 395/751 |
| 5,592,661 | 1/1997 | Eisenberg et al. | 395/600 |
| 5,614,940 | 3/1997 | Cobbley et al. | 348/7 |
| 5,638,509 | 6/1997 | Dunphy et al. | 395/182.18 |

OTHER PUBLICATIONS

Ross Burgess, UNIX Systems for Microcomputers, 1988, Chapter 12.
S. J. Leffler, The Design and Implementation of the 4.3BSD UNIX Operating System, 1989, Chapters 6 and 7.

*Primary Examiner*—Thomas G. Black
*Assistant Examiner*—Jean R. Homere
*Attorney, Agent, or Firm*—William J. Kubida; Homer L. Knearl; Holland & Hart LLP

[57] ABSTRACT

Various versions of a computer file are provided without requiring copying the file or logging changed data, so that the files have consistent user data. A program module responds to a system call argument and allocates another node in file system tables and copies metadata information from the old node into the new node, so that both nodes contain the same data block allocation information. Portions of the module set shadow pointers in the old node to point to the new node, and in the new node to point to the old node. Changes to data are made with respect to the new node and fresh physical data blocks are allocated for the changed blocks. A method includes the steps of allocating a new node for storing file allocation information for another version of an existing file; logically connecting the new node to the existing node for file name and other purposes; and replacing node identification information in the directory with the new mode identification. In other steps the method replaces the current node identification information of a file in the directory with previous node identification information obtained from the current node; and logically disconnects the current node from the previous node.

23 Claims, 11 Drawing Sheets

COMPUTER SYSTEM METHOD AND APPARATUS PROVIDING FOR VARIOUS VERSIONS OF A FILE WITHOUT REQUIRING DATA COPY OR LOG OPERATIONS

BACKGROUND OF THE INVENTION

1. Field of the Invention:

This invention relates in general to file systems of computer operating systems and more particularly to systems for providing consistent user data in such file systems.

2. Description of the Prior Art:

It is known in file systems that some data base operations require the writing of multiple records as part of a single transaction. If the operator abandons the transaction before completion, or power is lost to the system during the course of updating records, data is left in an inconsistent state. As described in chapter 12 of UNIX SYSTEMS FOR MICROCOMPUTERS by Ross Burgess, published in 1988 by BSP Professional books of three Cambridge Center, suite 208, Cambridge Mass., in the Structured Query Language, a COMMIT WORK statement is architected to signify the logical end of a transaction and cause the file records to be changed. According to this reference, many database managers keep a file of records as they existed before change by the transaction. The transaction may then be abandoned consistently by restoring the original records. Another technique is to log each change in a journal or log file before the actual file system records are changed. Then if a system crash occurs due to power failure for example, the files are restored to a state that existed at the last time they were dumped to backup archive media and the log file is used to update the restored files to the point of all transactions that were fully completed at the time of the crash. Both of these techniques cause a bottleneck at the point of logging, whether it be the original file records that are saved or the new changes to the files prior to the changes being made on the final media.

The actual data logging described above should be distinguished from logging of the internal file metadata as is described in U.S. patent application Ser. No. 08/526,790 hereby incorporated herein by reference. Metadata is not the actual data but is information needed by the file system in order to locate the data on the final media and other information usually kept in directories and/or index nodes. Since this metadata is also changed each time a transaction is processed, there is a risk that it will be lost if the system crashes. Metadata is much shorter than the actual transaction data however and therefore does not usually present a bottleneck in the overall performance of a file system.

In another approach to reducing the concern for lost data, some computer users copy an original file and give it a new name before commencing to update the data with transaction changes. Again the transaction processing is significantly delayed and consistency is lost because the user may not be consistent in the choice of names and may even forget to perform the copy step before update and also because the copy is not an atomic operation.

SUMMARY OF THE INVENTION

In accordance with the instant invention, the above problems of inconsistency and throughput bottlenecks have been solved by providing for various versions of a file without the need for data copy or log operations. The same name as was used for the original file will be used to identify the latest version of the file. The invention is further enhanced by providing for new file system functions comprising a ROLLBACK call to restore a previous version of a file by associating the file name with the metadata for the previous version. A further function in the form of a REAP call lends even more convenient utility to the invention by removing previous versions of a file that are determined to be no longer needed and impractical to retain indefinitely. In another embodiment, still further benefit is obtained by providing an additional argument for an existing file system call such as for example FSYNC, for the provision of a new version.

Apparatus providing for various versions of a file without the need for copying such files or logging the changed data has a module responsive to a system call argument to allocate another node in the file system tables and to copy the data block allocations from the old node into the newly allocated node. Both nodes now contain the same data block allocation information. Shadow pointers are set in the old node to point to the new node and set in the new node to point to the old node. Changes to the actual data are now made with respect to the new node and fresh data blocks are allocated for the changed blocks. In this way only the changed blocks need be written to media and the unchanged blocks including the originals of the changed blocks are left unchanged on the media. No separate data log need be kept for purposes of data consistency.

The inventive process includes the computer implemented steps of allocating a new node for storing file allocation information for another version of an existing file; logically connecting the new node to the existing node for file name and other purposes; replacing the node identification information in the directory with the identification of the new node; and updating the file by allocating fresh data blocks to store data of blocks that change. In a further feature of the invention, the process replaces the current node identification information of a file in the directory with previous node identification information obtained from the current node; and logically disconnects the current node from the previous node, thereby rolling back the version of the file to the previous version without requiring that a backup archive media be loaded or a log file processed. A still further feature of the process of the invention logically disconnects a previous node from a later node in order to release the previous node storage space and to remove the previous version of the file from the media.

The technique of the present invention is of especial utility in providing consistent user data in a file system regardless of operator premature termination of a transaction or system failure.

DETAILED DESCRIPTION

Figure 1:
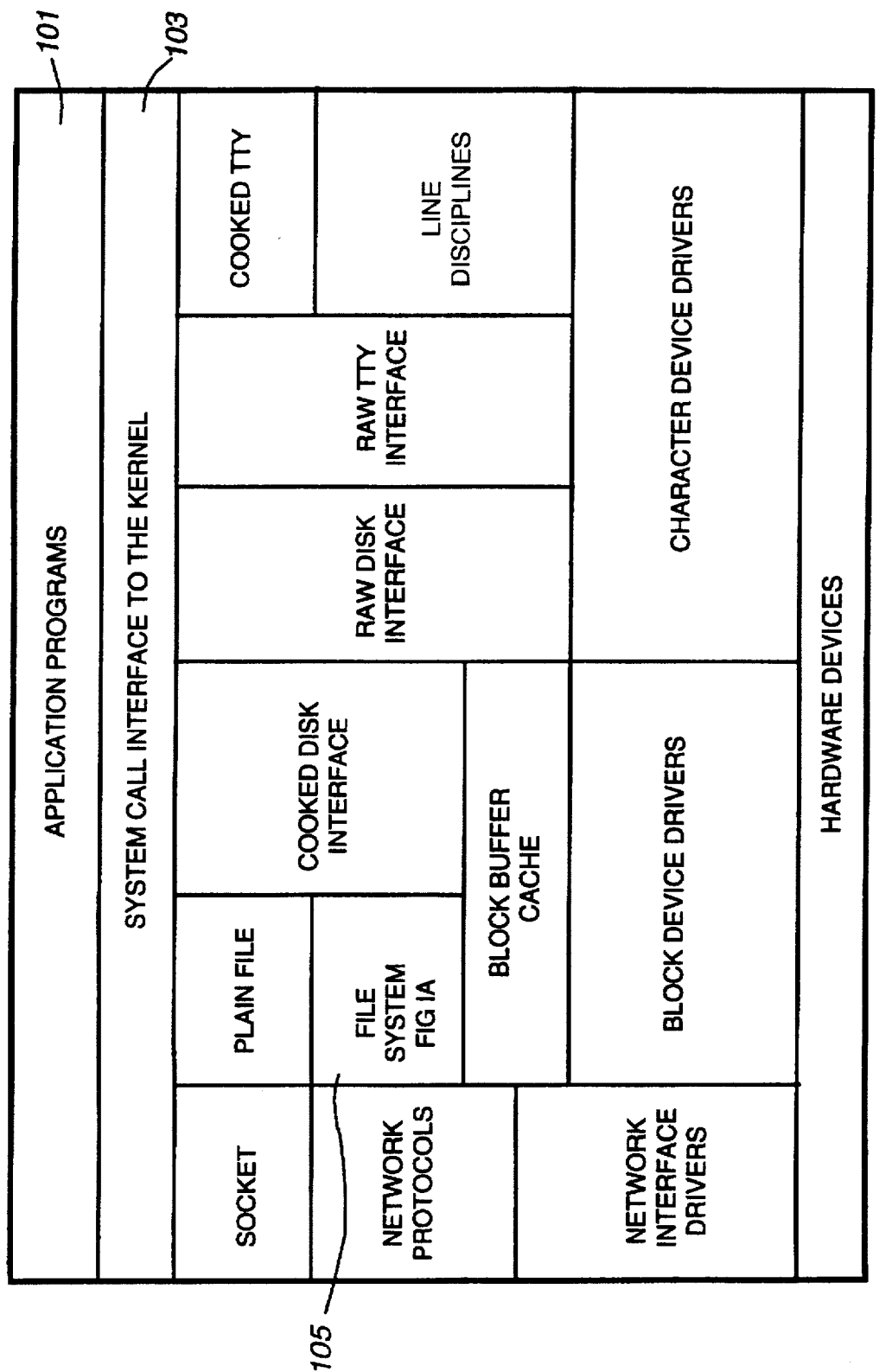
FIG. 1 is a block diagram showing the relationship of an application program to the various levels of the operating system and the media device in accordance with the invention.

The structures and modules by which the invention may be embodied in a UNIX example will now be described with respect to FIGS. 1, 1A, 1B 1C and 1D. FIG. 1 is a summary of the various prior art systems that are part of a typical UNIX file system. Application programs 101 use the system call interface 103 to call file system functions implemented in file system 105 to perform data storage and retrieval functions which are described in more detail in chapter 6 of the textbook entitled "The Design and Implementation of the 4.3BSD UNIX Operating System" by Samuel J. Leffler et.al from which most of FIG. 1 was taken. This book was published by Addison-Wesley Publishing Company in 1989 and is hereby incorporated herein by reference. Note that the file system block 105 refers to FIG. 1A wherein the modules and structures of the invention are shown.

Figure 1A:
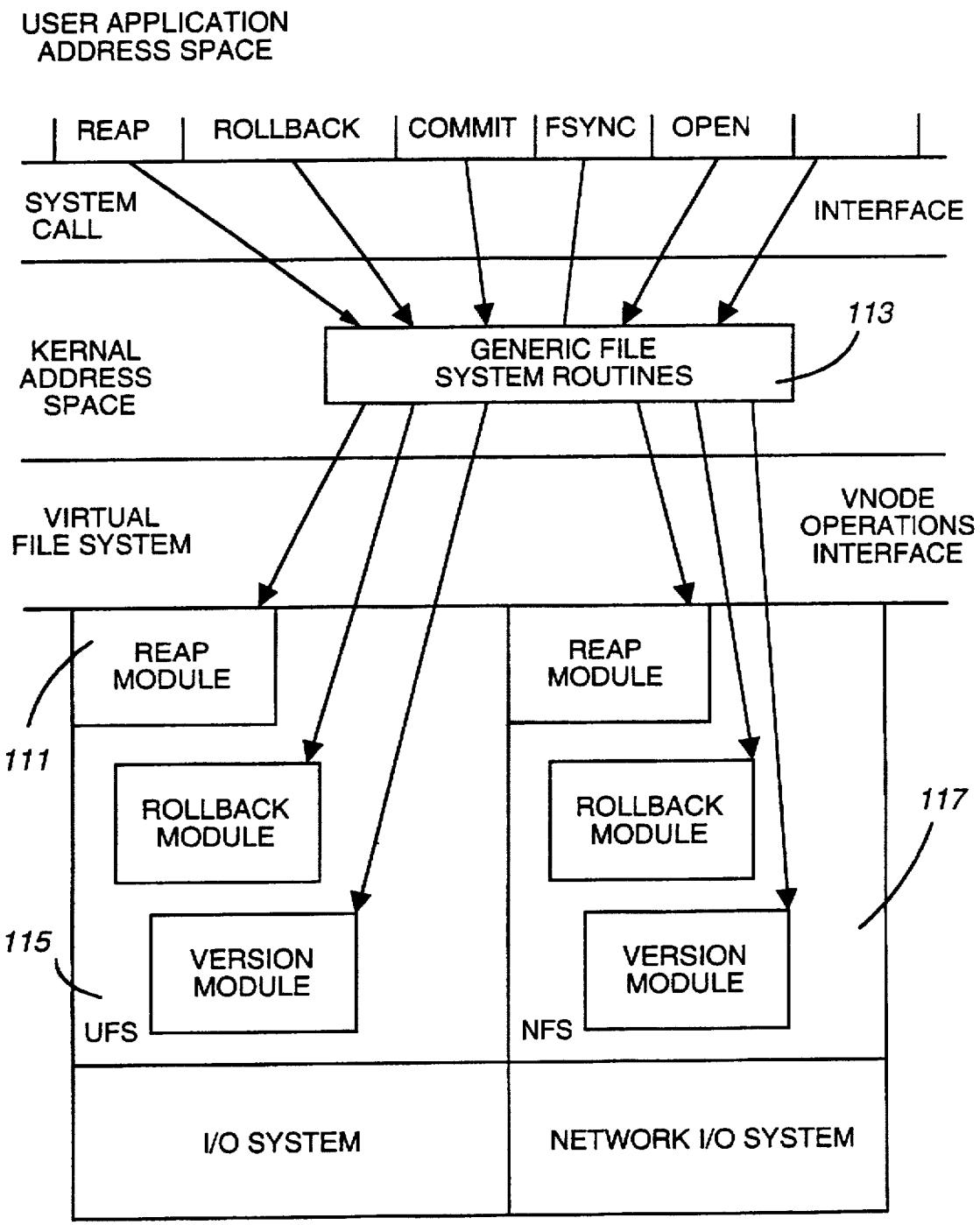
FIG. 1A shows the structure of the file system of FIG. 1 according to the invention.

At the top of FIG. 1A, the new system call arguments are shown and they are received by their corresponding modules in the UNIX File System UFS 115 and the Network File System NFS 117 via the generic file system routines 113. The VERSION module 107 provides for various versions of a file without the need for data copy or log operations. Module 107 receives an input signal from either the COMMIT system call or the FSYNC call. The ROLLBACK module 109 restores a previous version of a file by associating the file name with the metadata for the previous version. The REAP module removes previous versions of a file that are determined to be no longer needed and impractical to retain indefinitely. These new modules 107, 109, and 111 can be duplicated in a number of file system such as UFS 115 and NFS 117 as shown in FIG. 1A or used in only one such system. These modules are shown in more detail in Figure 1B, 1C, and 1D.

Figure 1B:
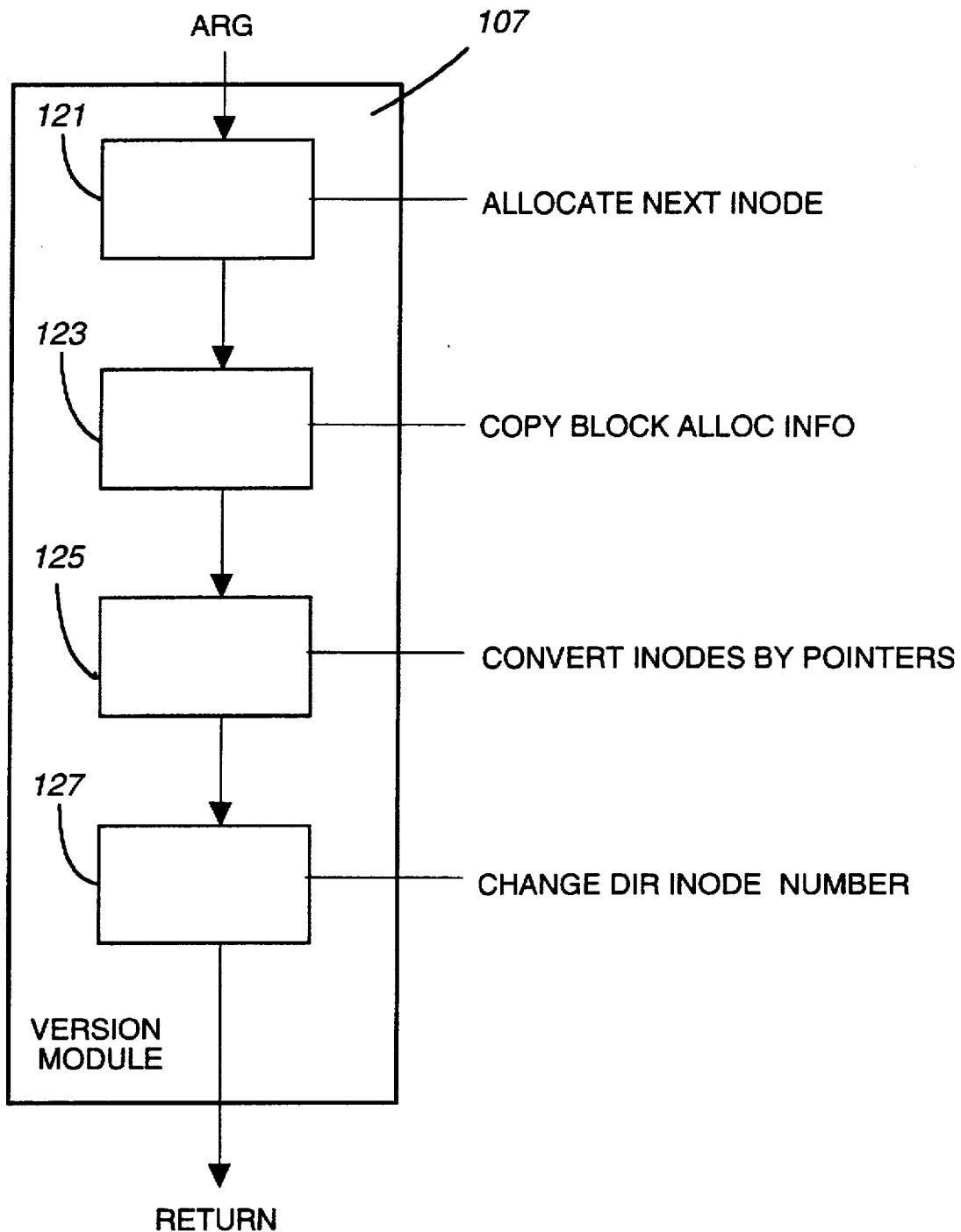
FIG. 1B shows the operative portions of the version module.

In FIG. 1B, the portions of module 107 are shown along with the output signals that embody the steps of the method of the present invention. Portion 121 receives the COMMIT system call or the version argument associated with the FSYNC call and allocates a next index node (inode) to store the metadata of the version of the file. Control then passes to the portion 123 where an output copies the block allocation information from an original inode of a file to the next inode. Portion 125 then acts to connect the original and the next inode by pointers, and lastly, portion 127 acts to change the inode number in the directory entry for the file for which a next version is being created.

Figure 1C:
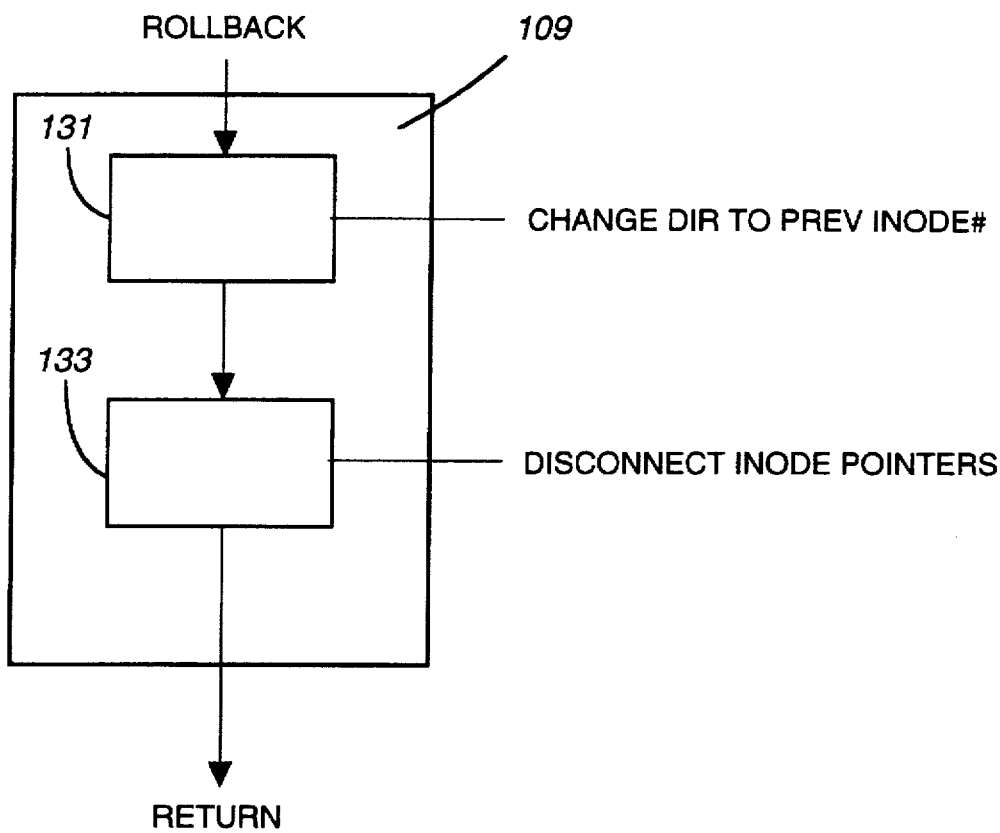
FIG. 1C shows the operative portions of the rollback module.

FIG. 1C shows the portions of ROLLBACK module 109 that are operative to restore a previous version of a file, that may for example be the original, by associating the file name with the metadata for the previous version. This is accomplished by portion 131 providing an output to change the inode number in the directory entry for the file from the current (called next above) inode to the previous (called original above) inode. Control then passes to portion 133 which changes the values in the inode shadow pointers to zero thereby disconnecting the inodes from each other.

Figure 1D:
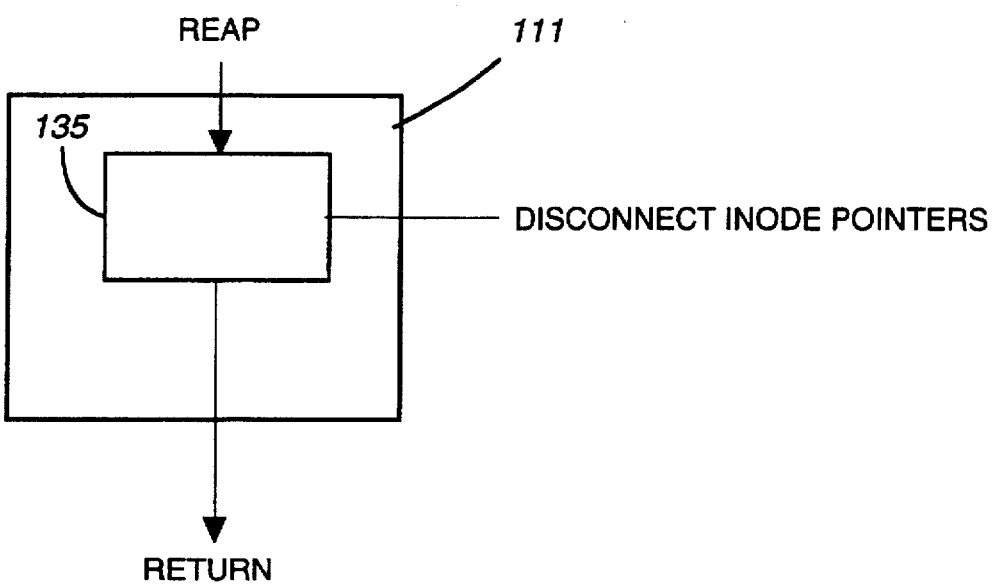
FIG. 1D shows the operative portions of the reap module.

Figure 1D shows the portion 135 of REAP module 111 that removes the previous version of the file from the media. Portion 135 provides an output to change the values in the inode shadow pointers to zero thereby disconnecting the inodes from each other without changing the inode number in the directory entry for the file. The version of the file thereby becomes the original of the file since the previous version can no longer be located. Those blocks that had been allocated to the previous version are no longer used and can be released for reuse by the prior art UFS "FREE" and "UFS??FREE"routines.

Figure 2:
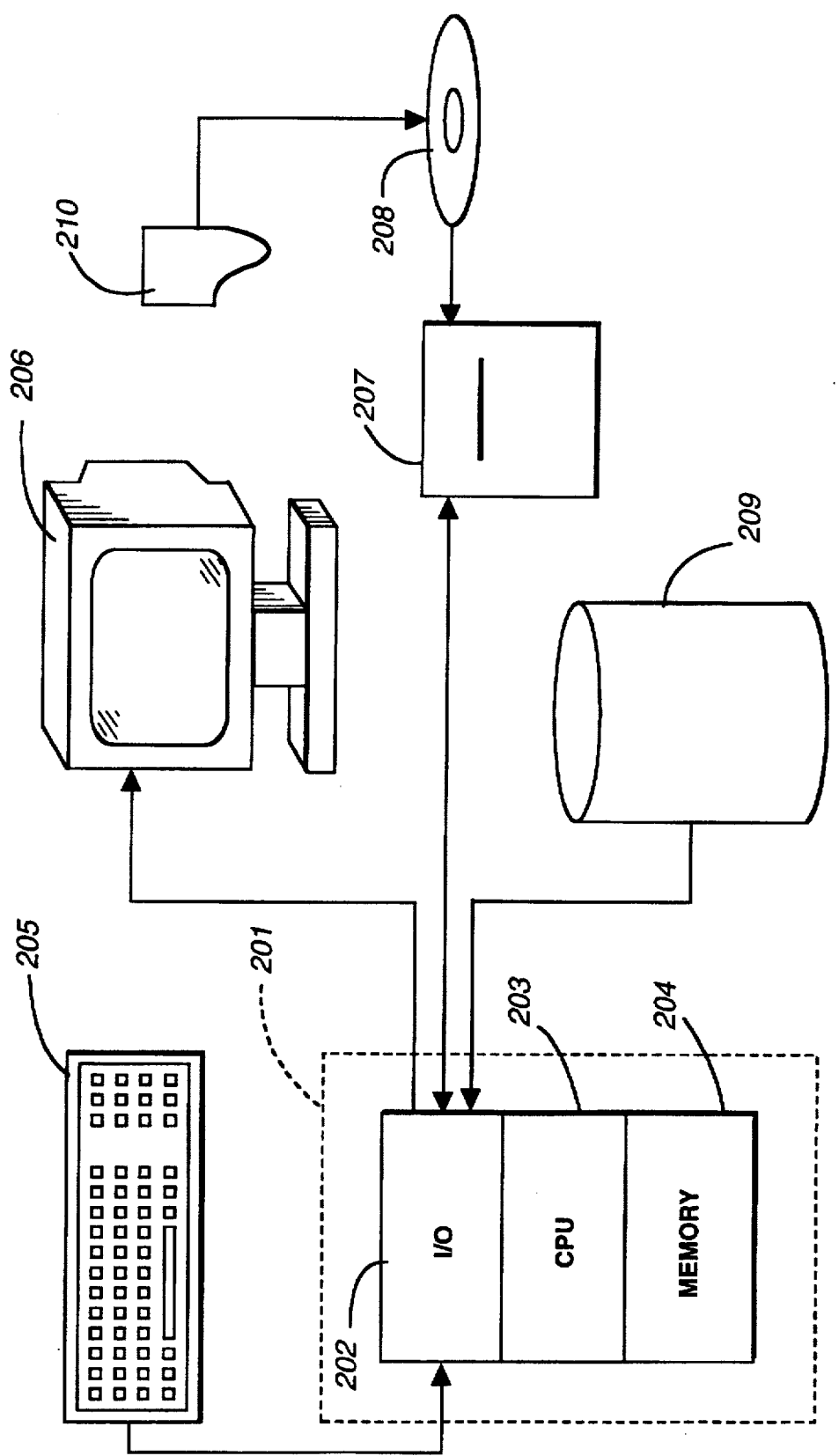
FIG. 2 is a simplified drawing of a general purpose computer forming a portion of the operating environment of the present invention.

The environment in which the present invention finds utility encompasses the general purpose distributed computing system, wherein general purpose computers, workstations or personal computers are connected by communications links of various types, into a client server arrangement, wherein programs and data, many in the form of objects, are made available by various members of the system for access and execution by other members of the system. FIG. 2 shows an exemplary general purpose workstation computer wherein a processor 201 is shown having an I/O section 202, a central processing unit or CPU 203 and a memory section 204. The I/O section 202 is connected to a keyboard 205, a visual display unit 206, a disk storage unit 209 and a compact disk read only memory (CDROM) drive unit 207. The CDROM unit 207 can read a CDROM medium 208 which typically contains program products 210 such as the version, rollback and reap modules of the invention as previously described with respect to FIG. 1 and FIGS. 1A through 1D. These computer program products contain mechanisms to effectuate the apparatus and methods of the present invention may reside in the memory 204, or on the disk storage unit 209, or on the CDROM 208 of such a system.

OPERATION OF THE PREFERRED EMBODIMENT

Figure 3:
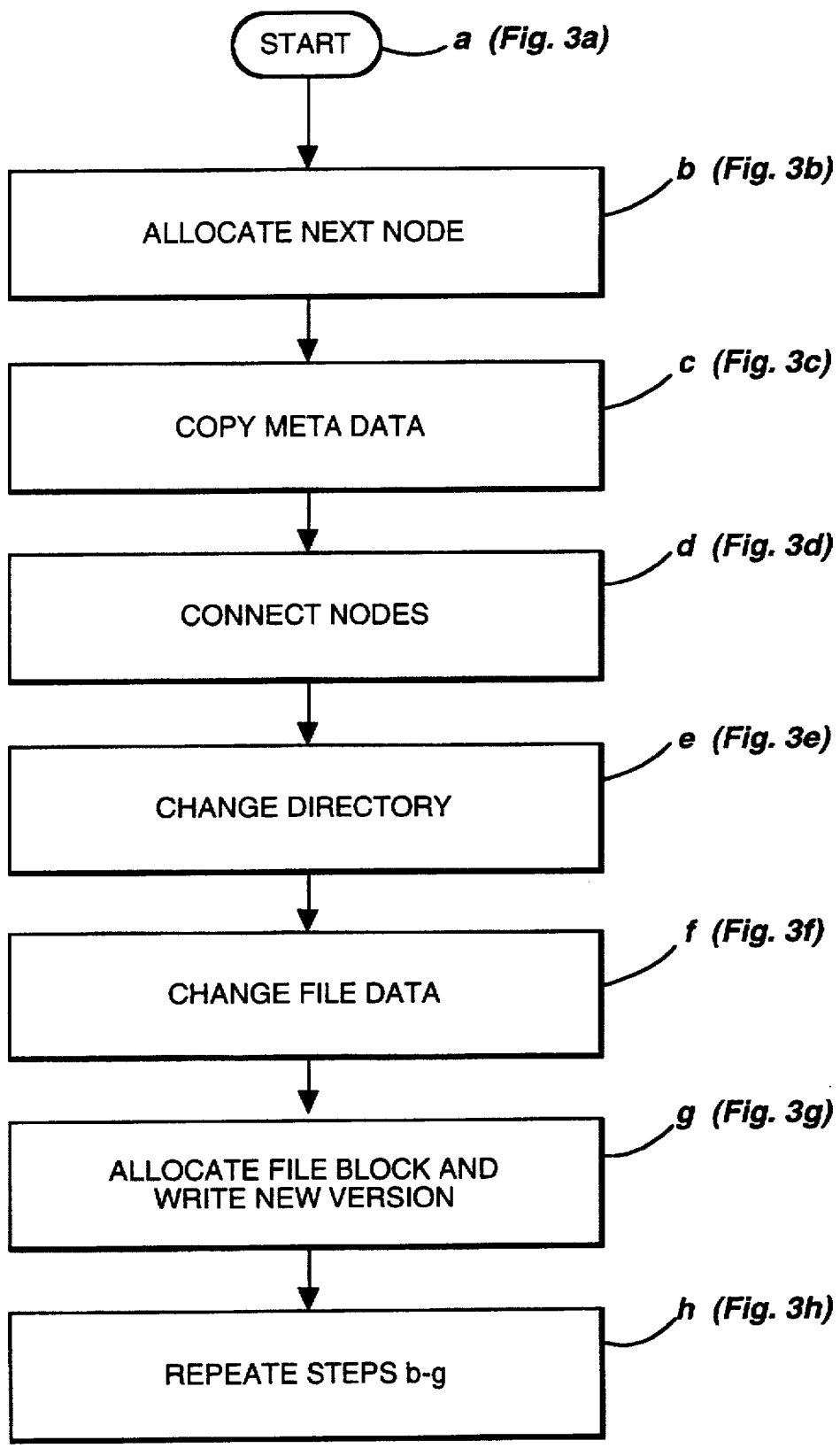
FIG. 3 is a diagram showing the steps of the process of the invention in the creation of new versions of a file according to the invention.

Referring now to FIG. 3, a flow diagram of the method of creating additional versions of an existing file named "NAME1" is set forth. Each step in the diagram of FIG. 3 is further set out in greater detail in each of the FIGS. 3a, 3b, 3c, 3d, 3e, 3f, 3g and 3h, respectively, wherein the sequence of allocation and connection of the control structures made in the creation of another version of an existing file named "NAME1" will be described.

Figure 3A:
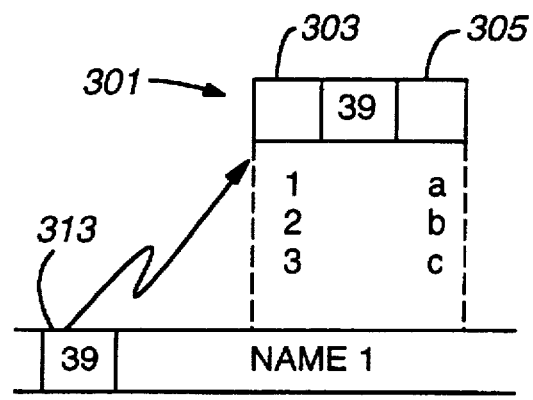
FIG. 3a shows directory and node structures.

In FIG. 3a, a single index node (inode) 301 having the inode number 39 is depicted. An entry 313 in the file directory for this file system contains the inode number 39 pointing to inode 301 thereby associating the name "NAME1" with the inode 301 in the usual manner of UNIX file systems. This inode 301 contains the file block allocations in columnar form showing that logical block 1 is mapped to physical block a, logical block 2 is mapped to physical block b and logical block 3 is mapped to physical block c and so forth in usual manner. Advantageously for the implementation of the instant invention, the inode 301 also has a back shadow pointer 303 value structure and a next shadow pointer value structure 305. These structures will be made more clear with respect to the following description of the remaining figures in FIG. 3. As further information is entered into the file of inode 301, additional blocks will be allocated by UFS_bmap and its subroutines used for block allocation in the UNIX architecture. The block addresses of these newly allocated blocks will also be entered into inode 301.

Figure 3B:
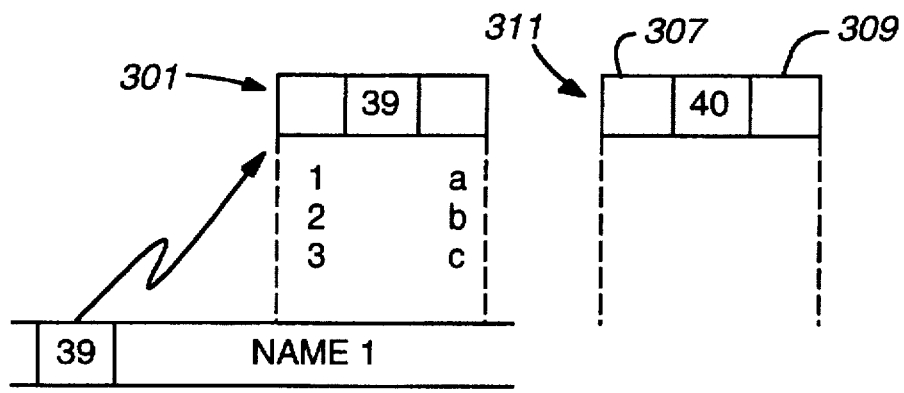
FIG. 3b shows allocation of a next node.
Figure 3C:
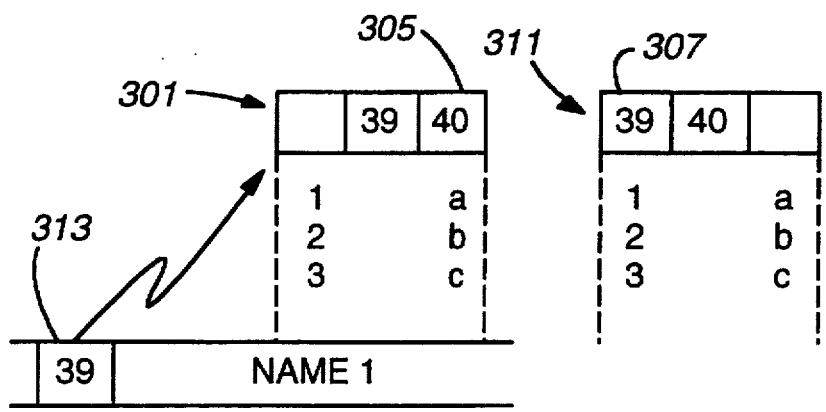
FIG. 3c shows copying of file metadata.
Figure 3D:
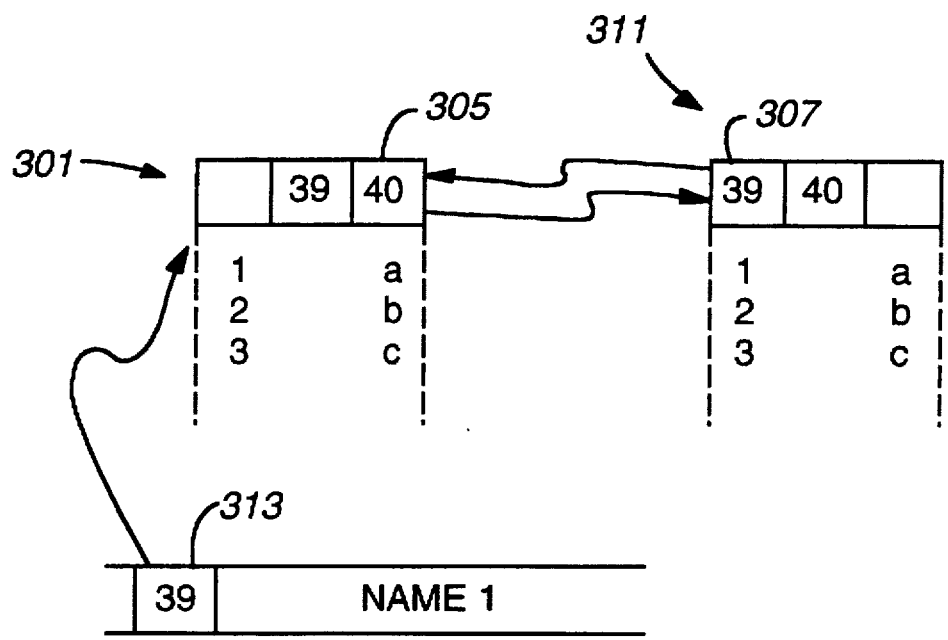
FIG. 3d shows connecting the nodes
Figure 3E:
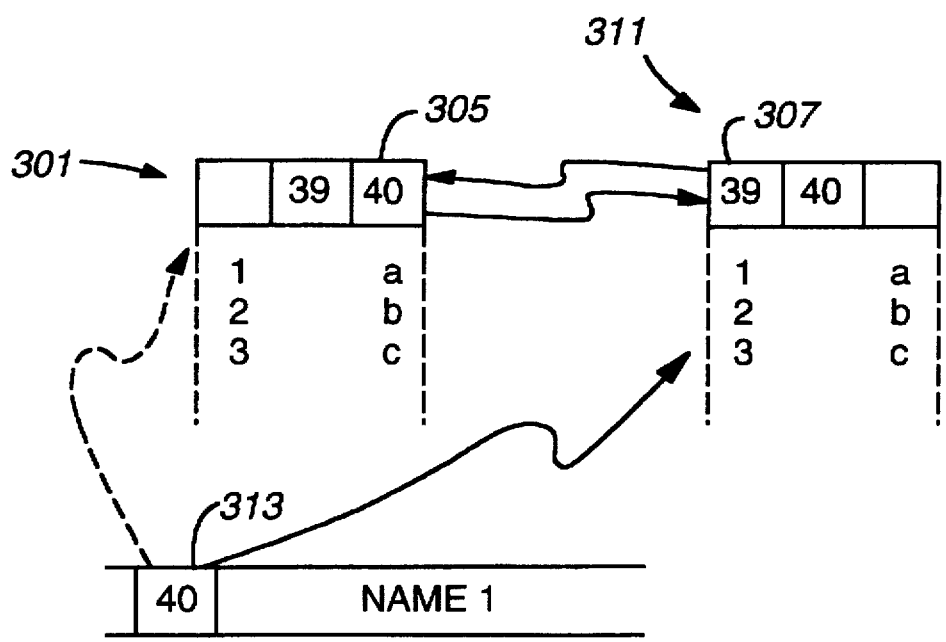
FIG. 3e shows the changing of the directory.

FIG. 3b portrays the structure of inodes after a COMMIT file operation or an FSYNC system call with a new version argument is received by the file system for the file named "NAME1". In response to the call, a new inode 311 having an inode number 40 has been allocated by portions of the open module and version module shown in FIG. 1. In FIG. 3c, the version module copies the block allocations from inode 301 to inode 311. There are now two inodes corresponding to a single file named "NAME1" and both inodes point to the same file blocks therefore no data copying has been required. The version module also connects the two inodes together as shown in FIG. 3d, by setting the shadow pointer 305 to the value 40 in order to point to inode 311 and setting the shadow pointer 307 to the value 39 to point back to inode 301. In FIG. 3e, the version module resets the inode pointer in the file directory entry 313 breaking the pointer to inode 301 numbered 39 and then sets the value in entry 313 to 40, pointing to inode 311 numbered 40.

Figure 3F:
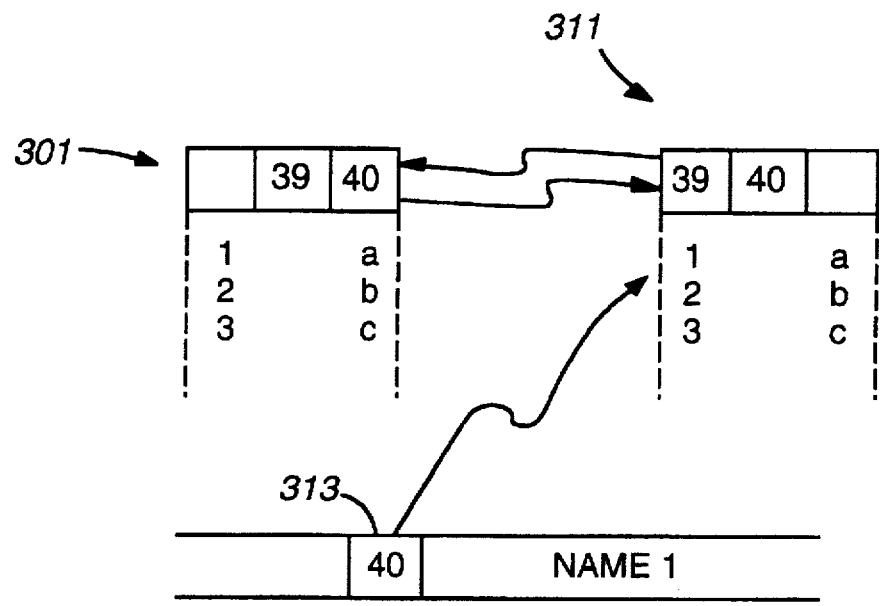
FIG. 3f shows changing file data.
Figure 3G:
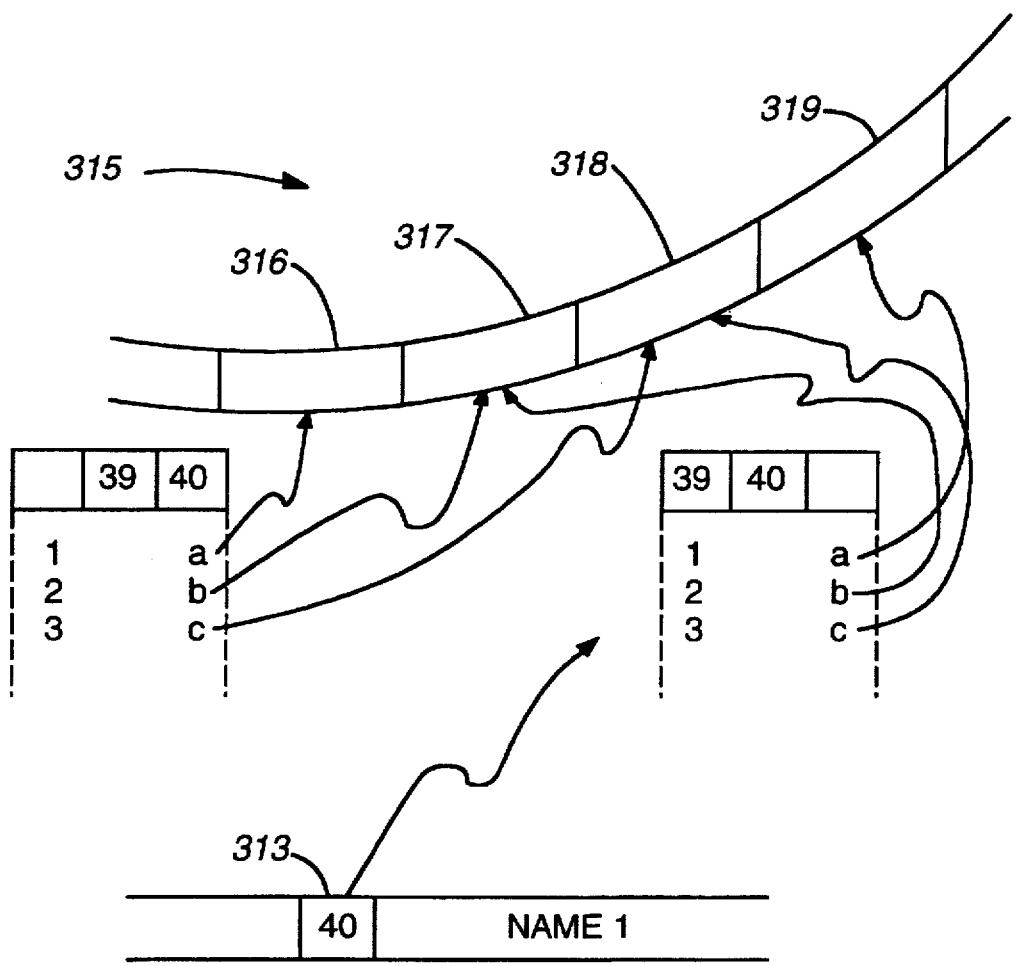
FIG. 3g shows allocation of a physical block for the changed file data.

In FIG. 3f, the application program has made changes to the actual data which was originally stored in logical block 1 and physical block a. As these changes are made by the application program, a fresh physical block d is allocated to logical block 1 and reflected in inode 311 where the letter d now corresponds to the logical block 1. The application program writes the changed data and it is eventually stored to physical block d on the final media. Note that the changed data occupies a different physical block d and the original data in physical block a that used to be associated with logical block 1 is still safely stored in block a and accessible through inode 301 although "NAME1" now points to inode 311. Therefore upon a read of "NAME1" it appears to the application program that the data in logical block 1 has changed. This arrangement is more clearly shown in FIG. 3g where media 315 having several physical blocks 316, 317, 318 and 319 appears on a curved disk track for example. The content of physical blocks 316, 317 and 318 need not by copied or rewritten thereby saving resources and time. Likewise the application data in physical block 319 can be written directly without the need for another copy in a log file. Block 319 in effect serves as both the log entry and the final record of the application data in the new version logical block 1.

Figure 3H:
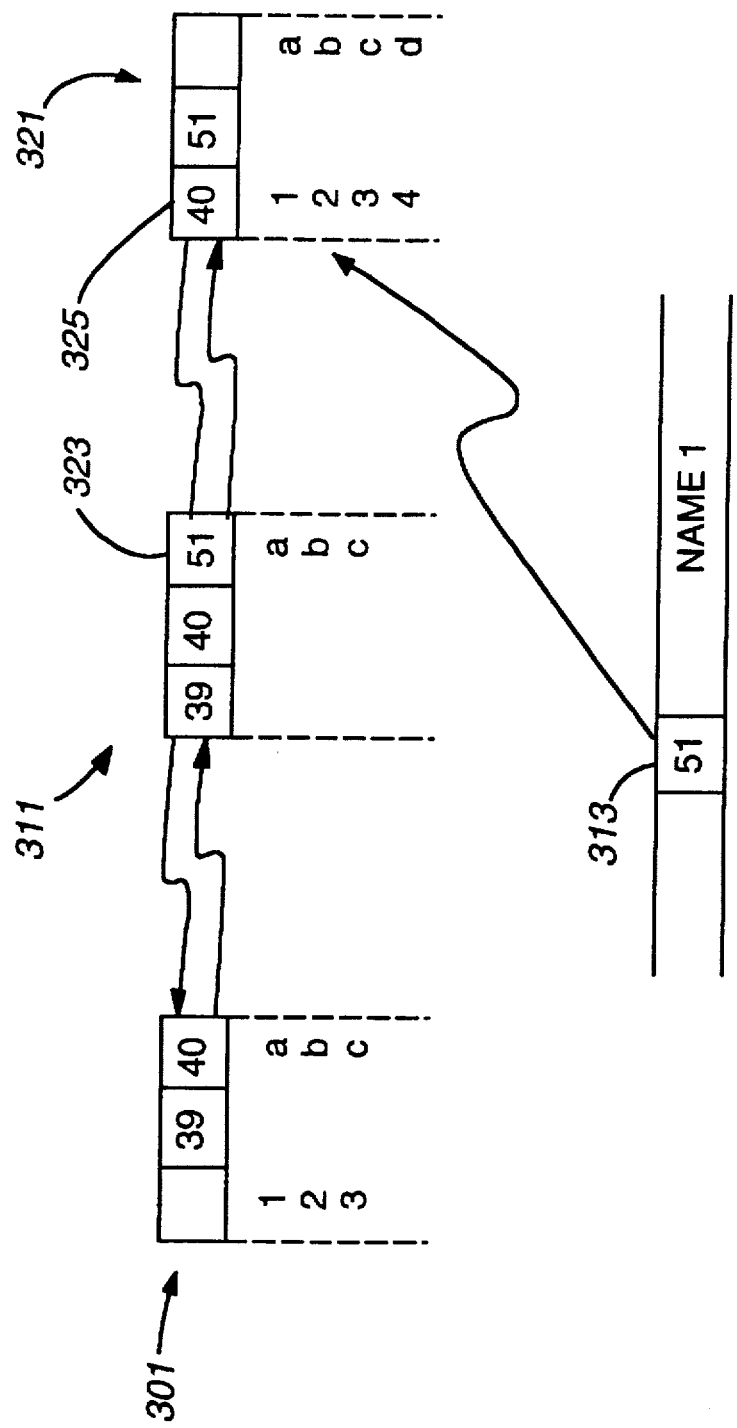
FIG. 3h shows an additional version of a file.

It will be recognized by those skilled in the art of system design that the structures used in accordance with the present invention will be repeatedly employed in order to create still further versions of a file such as "NAME1" as shown in FIG. 3h. In FIG. 3h, inode 321 has been allocated to a third version of "NAME1" and the directory has been updated to reflect the number 51 of inode 321. Likewise next shadow pointer 323 contains the number 51 and back pointer 325 contains the number 40. In this third version of "NAME1", a fourth physical block f has been allocated to a logical block 4 when the application program increased the size of the file.

Figure 4:
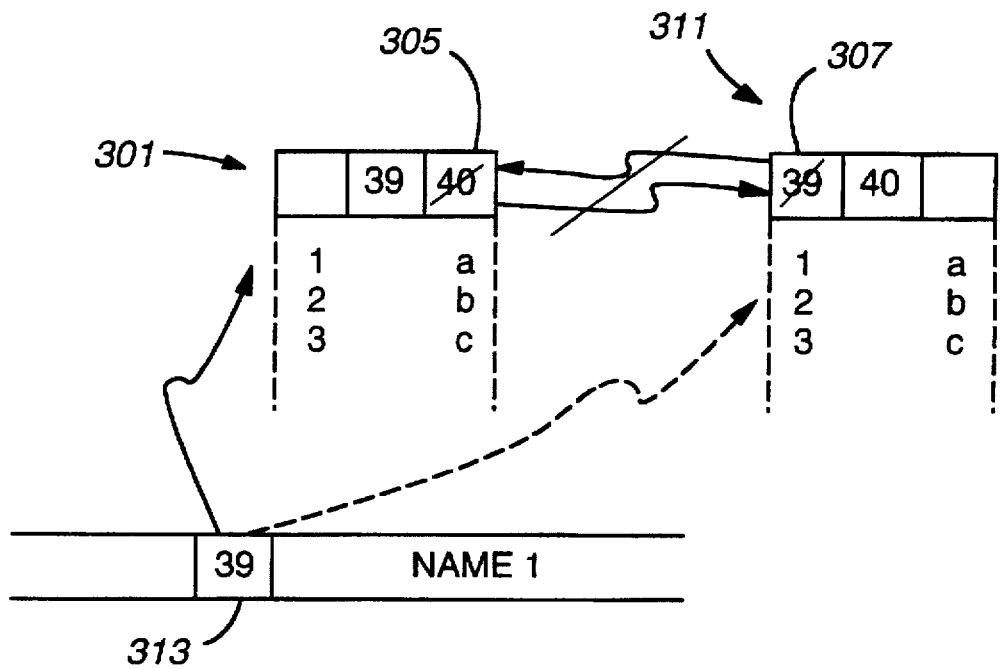
FIG. 4 shows the process of rollback.

Attention is now drawn to FIG. 4. In FIG. 4, the structure of the programmed apparatus implementing another feature of the invention called ROLLBACK is shown. In FIG. 4, it is assumed that for some reason, the previous version of "NAME1" is to be recovered. Perhaps the power was lost just as the physical block d was being written and before the write completed successfully, or perhaps the user of the application program has decided for other reasons to go back to the previous version. In response to the system call ROLLBACK,"NAME1" from the application program, the rollback module 111 causes the file system to find the inode associated with the current version of "NAME1" which is inode 311. In inode 311, the back shadow pointer structure 307 is accessed to learn the number of the previous versions inode number which is number 39. This number is then substituted into the directory entry 313 in place of the number 40 causing the directory entry to now point to inode 301. In order to release inode 311 and thereby remove the version of "NAME1" that is contained in the physical block d, the next shadow pointer 305 is reset and also the back shadow pointer 307 is reset. Thus inode 311 and physical block d again become available for reallocation in another version of "NAME1" or under a different file name.

Figure 5:
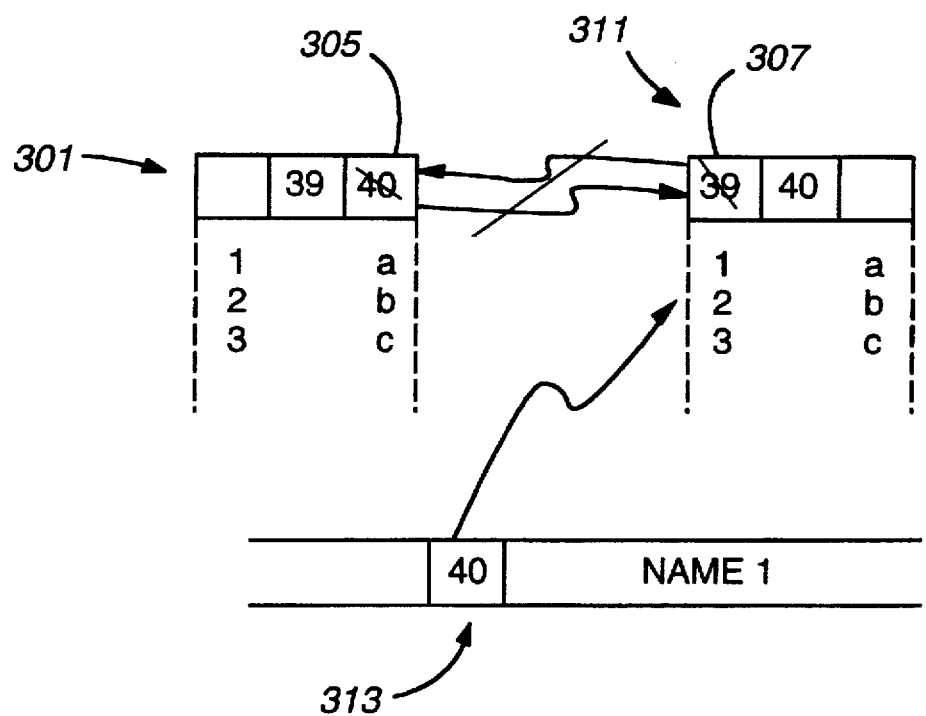
FIG. 5 shows the process of reap.

Attention is now drawn to FIG. 5. In FIG. 5, the structure of the programmed apparatus implementing another feature of the invention called REAP is shown. In FIG. 5, it is assumed that the previous version of "NAME1" is no longer needed because the actual data of the current version of the file has been filed without error and the operator is satisfied with its contents. In response to the system call REAP, "NAME1" from the application program, the rollback module 111 causes the file system to find the inode associated with the current version of "NAME1" which is inode 311. In inode 311, the back shadow pointer structure 307 is accessed to learn the number of the previous versions inode 301 which is number 39. In order to release inode 301 and thereby remove the version of "NAME1" that is contained in the physical block a, the next shadow pointer 305 is reset and also the back shadow pointer 307 is reset. Thus inode 301 and physical block a again become available for reallocation in another version of "NAME1" or under a different file name.

Having described the invention in terms of a preferred embodiment thereof in a UNIX type architecture, it will be recognized by those skilled in the art of computer system design that various changes in the structure and programming of the implementations described can be made, including the application of the invention in other operating system architectures, without departing from the spirit and scope of the invention which is measured by the following claims.

What is claimed is:

1. In a computer having an operating system including a file system, for executing an application program, a method of consistently storing user data from said application program into said file system comprising the computer implemented steps of:

A) receiving from said application program, an argument indicating that a version of an existing file is to be created;

B) allocating a version index structure;

C) copying from an original index structure into said version index structure, file storage block allocation information;

D) connecting said version index structure to said original index structure of said existing file; and E) resetting a connection to said original index structure of said existing file from a record of a name of said existing file and connecting said record of said name of said existing file to said version index structure.

2. The method of claim 1 further comprising the computer implemented steps of:

F) receiving from said application program, changes to said existing file;

G) allocating a fresh block of storage for storing said changes to said existing file;

H) recording fresh block allocation information in said version index structure; and J) recording said changes to said existing file in said fresh block.

3. The method of claim 1 further comprising the computer implemented steps of:

K) receiving from said application program, an argument indicating that a version of an existing file is to be removed from said file system;

L) reconnecting said record of said name of said existing file to said original index structure and disconnecting said record of said name of said existing file from said version index structure; and M) disconnecting said version index structure from said original index structure of said existing file.

4. The method of claim 1 further comprising the computer implemented steps of:

N) receiving from said application program, an argument indicating that an original of an existing file is to be removed while retaining said version of said existing file; and O) disconnecting said version index structure from said original index structure of said existing file.

5. The method of claim 1 wherein the connecting of step D) further comprises the steps of:

D1) setting a next pointer value in said original index structure to a value of said version index structure; and D2) setting a back pointer value in said version index structure to a value of said original index structure.

6. Apparatus in a computer having a processor, a plurality of storage devices, an operating system and a file system, for consistently storing user data from an application program into a file system, said apparatus comprising:

a version module in said operating system having an input for receiving from said application program, an argument indicating that a version of an existing file is to be created;

a first portion of said version module allocating a version index structure;

a second portion of said version module copying from an original index structure into said version index structure, file storage block allocation information;

a third portion of said version module connecting said version index structure to an original index structure of said existing file; and a fourth portion of said version module resetting a connection to said original index structure of said existing file from a record of a name of said existing file and connecting said record of said name of said existing file to said version index structure.

7. The apparatus of claim 6 further comprising:

a rollback module in said operating system having an input for receiving from said application program, an argument indicating that a version of an existing file is to be deleted;

a first portion of said rollback module reconnecting said record of said name of said existing file to said original index structure and disconnecting said record of said name of said existing file from said version index structure; and a second portion of said rollback module disconnecting said version index structure from said original index structure of said existing file.

8. The apparatus of claim 6 further comprising:

a deletion module in said operating system for receiving from said application program, an argument indicating that an original of an existing file is to be removed while retaining said version of said existing file;

a portion of said deletion module disconnecting said version index structure from said original index structure of said existing file.

9. The apparatus of claim 6 wherein said third portion of said version module further comprises:

a pointer portion for setting a next pointer value in said original index structure to a value of said version index structure and setting a back pointer value in said version index structure to a value of said original index structure.

10. A computer program storage medium readable by a computer and encoding a computer program of instructions for consistently storing user data from an application program into a file system, said computer program comprising the steps of:

A) receiving from said application program, an argument indicating that a version of an existing file is to be created;

B) allocating a version index structure and copying from an original index structure into said version index structure, file storage block allocation information;

C) connecting said version index structure to said original index structure of said existing file; and D) resetting a connection to said original index structure of said existing file from a record of a name of said existing file and connecting said record of said name of said existing file to said version index structure.

11. The computer program storage medium of claim 10 wherein said computer program further comprises the steps of:

E) receiving from said application program, changes to said existing file;

F) allocating a fresh block of storage for storing said changes to said existing file;

G) recording fresh block allocation information in said version index structure; and I) recording said changes to said existing file in said fresh block.

12. The computer program storage medium of claim 10 wherein said computer program further comprises the steps of:

J) receiving from said application program, an argument indicating that a version of an existing file is to be removed from said file system;

K) reconnecting said record of said name of said existing file to said original index structure and disconnecting said record of said name of said existing file from said version index structure; and L) disconnecting said version index structure from said original index structure of said existing file.

13. The computer program storage medium of claim 10 wherein said computer program further comprises the steps of:

M) receiving from said application program, an argument indicating that an original of an existing file is to be removed while retaining said version of said existing file; and L) disconnecting said version index structure from said original index structure of said existing file.

14. The computer program storage medium of claim 10 wherein said connecting of step C) of said computer program further comprises the steps of:
   C1) setting a next pointer value in said original index structure to a value of said version index structure; and
   C2) setting a back pointer value in said version index structure to a value of said original index structure.

15. A computer program product comprising:
   a computer useable medium having computer readable code embodied therein for consistently storing user data from an application program into a file system, said computer program product comprising:
   computer readable program code devices configured to receive from said application program, an argument indicating that a version of an existing file is to be created;
   computer readable program code devices configured to allocate a version index structure;
   computer readable program code devices configured to copy from an original index structure into said version index structure, file storage block allocation information;
   computer readable program code devices configured to connect said version index structure to an original index structure of said existing file; and
   computer readable program code devices configured to reset a connection to said original index structure of said existing file from a record of a name of said existing file and connecting said record of said name of said existing file to said version index structure.

16. The computer program product of claim 15 further comprising:
   computer readable code devices configured to receive from said application program, an argument indicating that an original of an existing file is to be removed while retaining said version of said existing file; and
   computer readable code devices configured to disconnect said version index structure from said original index structure of said existing file.

17. The computer program product of claim 15 further comprising:
   computer readable code devices configured to receive from said application program, an argument indicating that a version of an existing file is to be deleted;
   computer readable code devices configured to reconnect said record of said name of said existing file to said original index structure and disconnecting said record of said name of said existing file from said version index structure; and
   computer readable code devices configured to disconnect said version index structure from said original index structure of said existing file.

18. The computer program product of claim 15 further comprising:
   computer readable pointer code devices configured to set a next pointer value in said original index structure to a value of said version index structure and setting a back pointer value in said version index structure to a value of said original index structure.

19. In a computer having an operating system including a file system, for executing an application program, a method of consistently storing user data from said application program into said file system comprising the computer implemented steps of:
   A) receiving from said application program, an argument indicating that a version of an existing file is to be created;
   B) allocating a version index structure;
   C) copying from an original index structure into said version index structure, file storage block allocation information;
   D) connecting said version index structure to said original index structure of said existing file;
   E) resetting a connection to said original index structure of said existing file from a record of a name of said existing file and connecting said record of said name of said existing file to said version index structure;
   wherein the connecting of step D) further comprises the steps of:
      D1) setting a next pointer value in said original index structure to a numerical value of said version index structure; and
      D2) setting a back pointer value in said version index structure to a numerical value of said original index structure.

20. In a computer having a unix operating system including a file system, for executing an application program, a method of consistently storing user data from said application program into said file system comprising the computer implemented steps of:
   A) receiving from said application program, a system call argument indicating that a version of an existing file is to be created;
   B) allocating a version index structure;
   C) copying from an original index structure into said version index structure, file storage block allocation information;
   D) connecting said version index structure to said original index structure of said existing file;
   E) resetting a connection to said original index structure of said existing file from a record of a name of said existing file and connecting said record of said name of said existing file to said version index structure;
   wherein the connecting of step D) further comprises the steps of:
      D1) setting a next pointer value in said original index structure to a value of said version index structure; and
      D2) setting a back pointer value in said version index structure to a value of said original index structure.

21. Apparatus in a computer having a processor, a plurality of storage devices, an operating system and a file system, for consistently storing user data from an application program into a file system, said apparatus comprising:
   a version module in said operating system having an input for receiving from said application program, an argument indicating that a version of an existing file is to be created;
   a first portion of said version module allocating a version index structure;
   a second portion of said version module copying from an original index structure into said version index structure, file storage block allocation information;
   a third portion of said version module connecting said version index structure to an original index structure of said existing file;
   a fourth portion of said version module resetting a connection to said original index structure of said existing file from a record of a name of said existing file and connecting said record of said name of said existing file to said version index structure; and said third portion of said version module further comprising a pointer portion for setting a next pointer value in said original index structure to a value of said version index structure and setting a back pointer value in said version index structure to a value of said original index structure, said pointer portion setting a numerical value as said value of said version index structure and a numerical value as said value of said original index structure.

22. A computer program storage medium readable by a computer and encoding a computer program of instructions for consistently storing user data from an application program into a file system, said computer program comprising the steps of:

A) receiving from said application program, an argument indicating that a version of an existing file is to be created;

B) allocating a version index structure and copying from an original index structure into said version index structure, file storage block allocation information;

C) connecting said version index structure to said original index structure of said existing file; and D) resetting a connection to said original index structure of said existing file from a record of a name of said existing file and connecting said record of said name of said existing file to said version index structure;

said value of said version index structure and said value of said original index structure of said computer process being numerical values.

23. A computer program product comprising a computer useable medium having computer readable code embodied therein for consistently storing user data from an application program into a file system, said computer program product comprising:

computer readable program code devices configured to receive from said application program, an argument indicating that a version of an existing file is to be created;

computer readable program code devices configured to allocate a version index structure;

computer readable program code devices configured to copy from an original index structure into said version index structure, file storage block allocation information;

computer readable program code devices configured to connect said version index structure to an original index structure of said existing file;

computer readable program code devices configured to reset a connection to said original index structure of said existing file from a record of a name of said existing file and connecting said record of said name of said existing file to said version index structure; and computer readable pointer code devices configured to set a next pointer value in said original index structure to a numerical value of said version index structure and setting a back pointer value in said version index structure to a numerical value of said original index structure.

* * * * *